(12) United States Patent
Lin et al.

(10) Patent No.: US 10,915,361 B1
(45) Date of Patent: Feb. 9, 2021

(54) DYNAMIC CAPACITY BUFFERS

(71) Applicant: Amazon Technologies, Inc., Seattle, WA (US)

(72) Inventors: Wells Lin, Seattle, WA (US); Christopher Magee Greenwood, Seattle, WA (US); Linfeng Yu, Seattle, WA (US); Sriram Venugopal, Issaquah, WA (US); Patrick E. Brennan, Seattle, WA (US); Yilin Guo, Seattle, WA (US); Mitchell Gannon Flaherty, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 15/967,320

(22) Filed: Apr. 30, 2018

(51) Int. Cl.
*G06F 9/50* (2006.01)
*H04L 12/26* (2006.01)

(52) U.S. Cl.
CPC ............ *G06F 9/5016* (2013.01); *G06F 9/505* (2013.01); *H04L 43/04* (2013.01); *H04L 43/0882* (2013.01); *H04L 43/16* (2013.01)

(58) Field of Classification Search
CPC ....... G06F 9/5016; G06F 9/505; H04L 43/04; H04L 43/0882; H04L 43/16
See application file for complete search history.

(56) References Cited

U.S. PATENT DOCUMENTS

| | | | | |
|---|---|---|---|---|
| 8,103,769 | B1 * | 1/2012 | Weiser | G06F 9/5011 709/225 |
| 9,965,498 | B2 * | 5/2018 | Coutts | G06F 16/217 |
| 2012/0079492 | A1 * | 3/2012 | Chambliss | G06F 9/5083 718/104 |
| 2015/0277767 | A1 * | 10/2015 | Hamano | G06F 3/0665 711/114 |
| 2016/0070602 | A1 * | 3/2016 | Shimogawa | G06F 9/45558 718/1 |
| 2017/0075709 | A1 * | 3/2017 | Feng | G06F 9/45558 |
| 2018/0053095 | A1 * | 2/2018 | Farrell | G06N 20/00 |
| 2018/0167446 | A1 * | 6/2018 | Lewis | G06Q 10/06 |
| 2019/0042406 | A1 * | 2/2019 | Guniguntala | G06F 12/0253 |
| 2019/0188810 | A1 * | 6/2019 | Kiryu | G06Q 50/06 |

* cited by examiner

*Primary Examiner* — Michael A Keller
*Assistant Examiner* — Jsing Forng Lin
(74) *Attorney, Agent, or Firm* — Davis Wright Tremaine LLP

(57) ABSTRACT

A distributed system allocates capacity in response to client requests. The system monitors a rate of capacity allocation. Based on the monitored rate and on a set of parameters, the system generates a forecast of capacity available for allocation and determines a time when available capacity will fall below a threshold level. The system adjusts the parameters to cause the predicted time to align with a target time, and then causes the system to be reconfigured according to the adjusted parameters.

20 Claims, 8 Drawing Sheets

DYNAMIC CAPACITY BUFFERS

BACKGROUND

A distributed system may provide clients with access to a computing resource. Distributed systems typically comprise a plurality of computing nodes, each of which contributes a portion of the total capacity provided by the distributed system. One advantage of this approach is that the distributed system can be made to scale according to the needs of the clients. Additional nodes can be added as demand for capacity grows. There are, however, a number of difficulties associated with scaling capacity to meet demand. For example, the distributed system may be unable to provide additional capacity until the system is reconfigured to include an additional node. At the same time, maintaining excess capacity, for example by installing additional nodes before they are needed, can be inefficient or wasteful.

BRIEF DESCRIPTION OF THE DRAWINGS

Various techniques will be described with reference to the drawings, in which.

DETAILED DESCRIPTION

Figure 1:
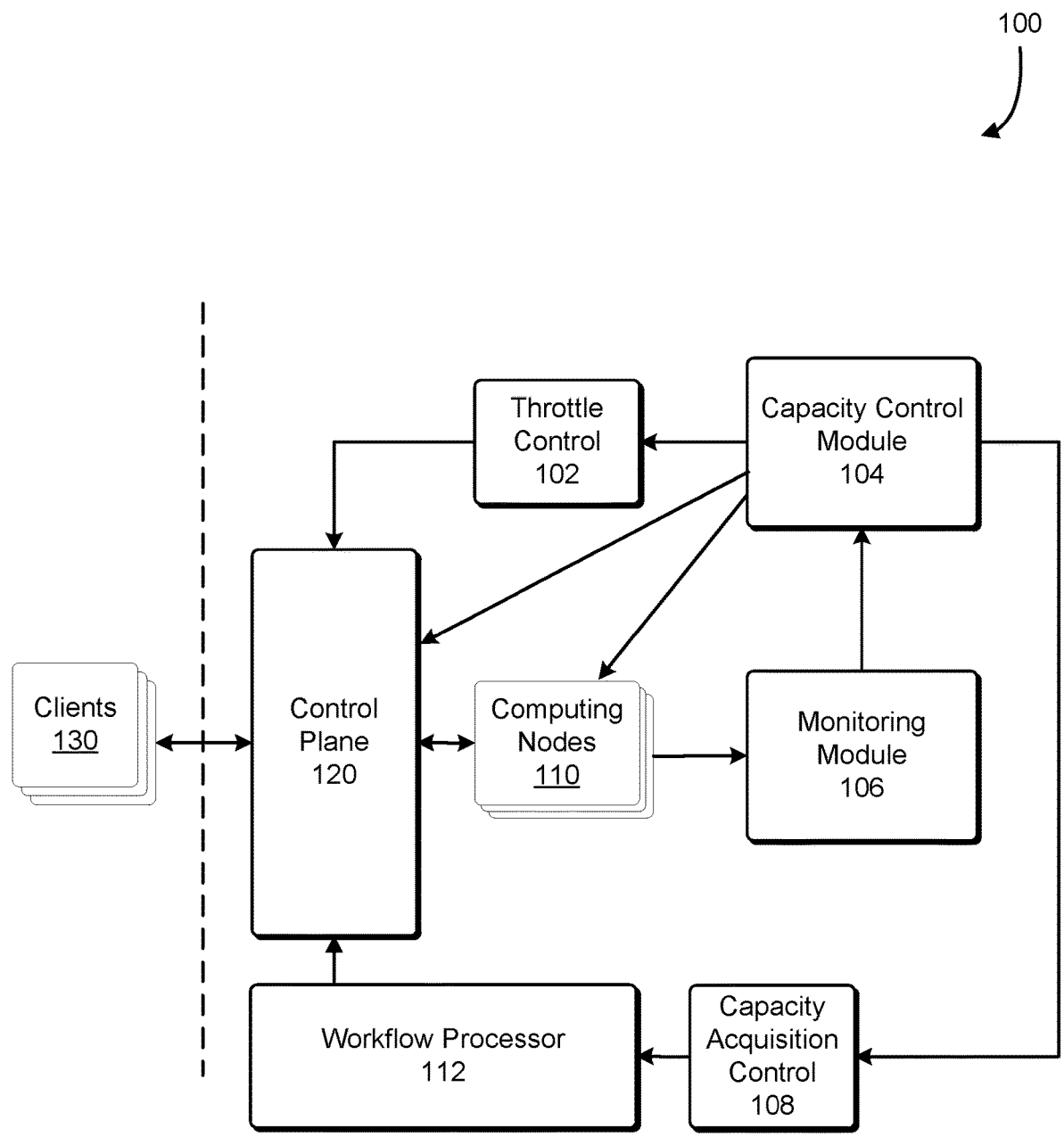
FIG. 1 illustrates an example environment of a distributed computing system in which reserved capacity maintained.

Embodiments of the present disclosure improve management of capacity in a distributed computing system. In an example embodiment, a distributed computing system generates a forecast of capacity available for allocation. The forecast predicts a time when, based on current conditions, the amount of capacity available for allocation to clients will fall below a threshold level. If the forecast predicts a time that is earlier or later than a target time, the forecast is regenerated based on a set of assumptions that have been altered so that the predicted time aligns again with the target time. The distributed computing system then causes the altered assumptions to be put into effect. This process repeats periodically so that the time capacity is expected to fall below a threshold level is kept at a fixed distance in the future.

In an example embodiment, a distributed computing system comprises a plurality of storage nodes. Each storage node contributes a portion of the system's capacity to provide clients with storage space. The distributed computing system generates a forecast based on the rate at which storage space is being allocated and amount of storage space currently available for allocation. The forecast predicts a time at which the amount of storage space available for allocation to a client will fall below a threshold level. If this time is earlier or later than a target time, the forecast is regenerated using a set of assumptions that are altered to produce a forecast whose predicted time aligns with the target time. In an embodiment, the altered set of assumptions includes changes to the amount of available storage space and changes to the conditions under which certain requests for storage space will be delayed or refused. The system then performs operations to put the altered assumptions into effect. This process is periodically repeated to keep the predicted time aligned with the target time at a fixed distance in the future.

A forecast of capacity available for allocation may be referred to herein as a runway. As used herein, the term runway refers to trend, forecast, or prediction of capacity allocation. In an example embodiment, significant points of the runway include the beginning and end of the runway. The beginning of the runway represents the current amount of capacity available for allocation, and the end represents a time at which capacity available for allocation falls below a threshold level. The runway may also be said to have a slope indicative of how rapidly available capacity is expected to fall, under a current set of conditions. A steep slope indicates rapid depletion of available capacity, while a gentle slope indicates a slow depletion.

In an example implementation, a distributed computing system determines whether the end of the runway aligns with a target time at some constant distance in the future. For example, the distributed computing system might generate a runway and determine whether the end of the runway aligns with a target time of two weeks from the time the forecast was generated. When the distributed system next generates the runway, it determines whether the end of the runway aligns with a target time of two weeks from that time, and so on. In such embodiments, the amount of reserved or buffered capacity is thus determined by a time or slope of a capacity prediction, rather than being a fixed amount.

In an embodiment, a distributed system reacts to a runway that is misaligned with a target time by taking actions which tend to cause the systems actual capacity usage to become aligned with the target time. The distributed system generates a runway based on parameters which are initially indicative of actual conditions, and then manipulates those parameters to determine what conditions would cause the actual trend to be aligned with the target time. The distributed system then initiates operations to cause the actual conditions of the system to correspond to the manipulated parameters.

In an embodiment, the manipulated parameters comprise an amount of capacity available for allocation. For example, the distributed system may predict a runway based in part on an adjusted parameter indicative of the amount of capacity currently available for allocation. Depending on how the parameter was adjusted, the distributed system can either cause additional capacity to be added to the system or cause excess capacity to be removed.

In an embodiment, the manipulated parameters comprise conditions under which at least some requests for capacity are to be made subject to throttling. For example, in an embodiment the distributed system generates the runway under an assumption that certain types of requests will be throttled once available capacity falls below a certain level, but prior to the end of the runway. Embodiments can manipulate the throttling of low-priority request in order to extend the runway for high-priority requests. In other words, the prediction may incorporate an assumption about when low-priority requests will be throttled in order to extend the predicted time for throttling high-priority requests.

Embodiments of the present disclosure may be practiced in conjunction with a distributed, block-based storage system. A block-based storage system may provide structurally agnostic data storage services to clients via a programming interface. To provide for elastic or adjustable storage capacity, data maintain on behalf of a particular client may be spread over a number of storage nodes. Further, block-based storage systems may replicate data between nodes in order to increase data availability and reduce the possibility of data loss. Blocks intended for this use may be referred to as redundancy blocks.

In an embodiment, a request for capacity corresponds to a request to allocate a one or more blocks of storage. Here, a block refers to one or more units of storage space that may be treated as a storage volume. For example, a unit of storage space may be allocated and then formatted to support a file system, such as NTFS, FAT, APFS, VMFS, and so on. Requests to allocate blocks may be provided via a block-level protocol such as Small Computer System Interface ("SCSI"), Internet Small Computer System Interface ("iSCSI"), Fibre Channel over Ethernet ("FCoE"), and so on.

In some instances, a request for a block-level allocation may correspond to a request to obtain storage space for a boot volume, or some other purpose which is deemed to be high-priority. In other instances, a request for a block-level allocation may be for general-purpose data storage, redundancy storage (sometimes referred to as replicated storage or master-slave storage), or some other purpose which is deemed to be of low-priority. It will be appreciated that these examples are intended to be illustrative. As such, the examples given should not be construed so as to limit the scope of the present disclosure to embodiments which adhere to the provided examples of prioritization.

In an embodiment, forecasts of capacity utilization may be based on assumptions that lower-priority requests will be throttled before higher-priority requests. For example, in an embodiment practiced in conjunction with block-level storage, requests for data volumes or redundancy volumes might be throttled before boot volumes, in order to delay the time at which boot volume requests would become subject to throttling, while still managing reserved capacity efficiently.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. Compared to a typical approach of maintained a fixed amount of excess capacity, at least some of the disclosed embodiments utilize computing resources more efficiently. For example, compared to the typical approach, the disclosed embodiments may cause additional capacity to be made available closer to the time the additional capacity will be used. At least some of the disclosed embodiments may prevent throttling of high-priority requests while using spare capacity more efficiently compared to systems employing typical techniques for maintaining spare capacity.

FIG. 1 illustrates an example environment of a distributed computing system 100 in which reserved capacity is maintained. A group of computing nodes 110 provides access to computing resources to clients 130. A computing resource may, for example, comprise storage space, processor time, database access, and so forth. The ability of the computing nodes 110 to provide the resource may be described as the capacity of the computing nodes 110. Reserved capacity refers to capacity that has not been allocated and that is available for allocation.

In an embodiment, the clients 130 transmit requests for computing resources. In an embodiment, a request for computing capacity comprises information indicating the amount of capacity that is being requested, and information that is indicative of a priority of the request. For example, a request for data storage space may indicate the amount of storage space being requested, and an identifier indicating the use to which the storage capacity will be put. In an embodiment, a priority associated with the request may be inferred based on the intended usage of the storage space.

In an embodiment, a control plane 120 is a module that manages requests for capacity. In an embodiment, the control plane 120 obtains a request from one of the clients 130 and interacts with the computing nodes 110 to determine if sufficient capacity is available to fulfill the request. If so, the control plane 120 causes capacity to be allocated in response to the request. However, if sufficient capacity is not available, the control plane 120 either refuses the request or causes fulfillment of the request to be delayed. Refusing or delaying fulfillment of requests to allocate capacity may be referred to as throttling.

As used herein, allocating capacity refers, unless clear from the context in which the term is used, to assigning or associating capacity to perform a computing function to a client. In contrast, reserving capacity, as used herein and unless clear from the context in which the term is used, refers to maintaining a pool or buffer of extra capacity that is available for allocating to a client. Reserving capacity may therefore refer, as used herein, to an amount of aggregate capacity of the computing nodes 110 that is unallocated to a client and available to provide a computing resource in response to a client request.

In an embodiment, the control plane 120 may refuse or delay requests in response to input from a throttle control 102. In cases and embodiments, the throttle control provides the control plane 120 with information that identifies types or classes of requests that should be made subject to throttling, and the conditions under which the throttling should occur. For example, in an embodiment the throttle control 102 signals the control plane 120 to indicate that low-priority requests for capacity should be throttled if reserved capacity falls below a first threshold, and that medium-priority requests should be throttled if reserved capacity falls below a second, lower, threshold.

In an embodiment, the computing nodes 110 provide an aggregated pool of capacity. For example, in an embodiment, each of the computing nodes 110 corresponds to a computing device with a processor, memory, and storage, by which the computing node contributes to the provision of a computing resource. As the capacity of each node to provide the computing resource is allocated, the total amount of available capacity, which may be referred to as the aggregated reserved capacity, or the reserved capacity, is reduced. Accordingly, each allocation reduces the amount of reserved capacity.

In an embodiment, a monitoring module 106 may obtain capacity allocation information from the computing nodes 110. For example, in an embodiment, the computing nodes 110 provide capacity allocation information to the monitoring module 106 on a periodic basis. For example, a computing node might periodically transmit a message to monitoring module 106 to indicate how much capacity remains available on the computing node. The monitoring module 106 aggregates this information to identify total amount of available capacity.

Figure 2:
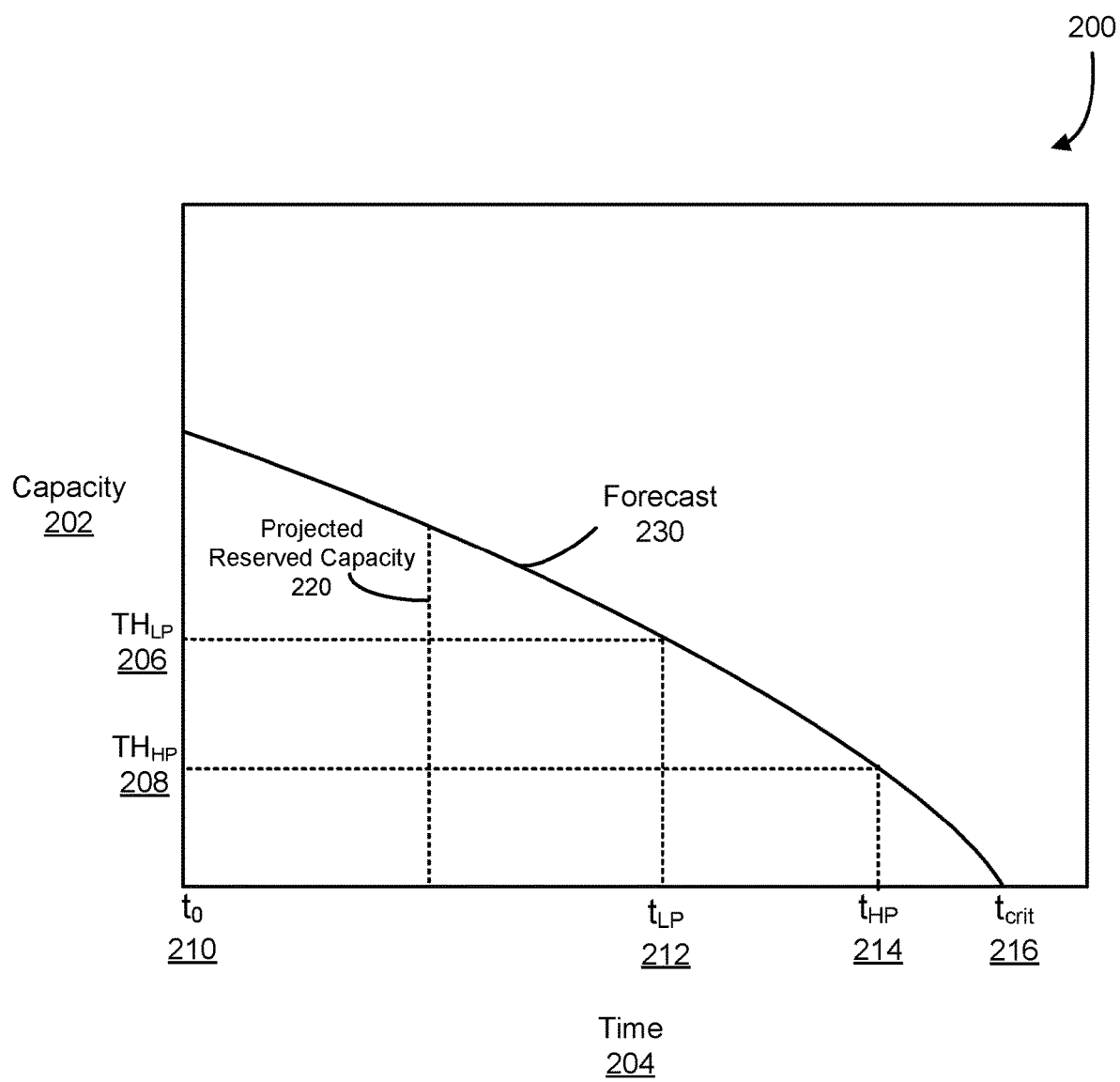
FIG. 2 illustrates an example forecast of a capacity control module.

In an embodiment, a capacity control module 104 receives capacity utilization information from the monitoring module 106 and generates a forecast of future available capacity. The forecast includes an estimate of the time at which available capacity will be less than a threshold amount. Examples of such forecasts are depicted in FIGS. 1 and 2. In an embodiment, the capacity control module 104 bases the prediction on a rate at which the capacity of the computing nodes 110 is being allocated, and on one or more additional parameters. In a further aspect, the additional parameters include parameters specifying an amount of capacity to hold in reserve and parameters specifying conditions for throttling.

In an embodiment, the capacity control module 104 generates an adjusted forecast based on manipulation of the parameters. As noted above, in an embodiment the capacity control module 104 predicts a time at which available capacity of the computing nodes 110 will be less than a threshold amount. The capacity control module 104 adjusts the parameters to cause this time to be equal, or approximately equal, to a target time. For example, in an embodiment the capacity control module 104 adjusts the parameters until the predicted time is within a threshold percentage of a target time. In one example, the capacity control module 104 adjusts the parameters to arrive at a predicted time of two weeks from the present, plus or minus one day. A variety of techniques may be employed to identify values for the adjusted parameters, including direct calculation and heuristic techniques.

In an embodiment, the capacity control module 104 provides information pertaining to the adjusted capacity reservation parameter to the capacity acquisition control 108. The capacity acquisition control 108 responds to the information by triggering adjustments to the process by which capacity is added to the computing nodes 110. For example, in an embodiment, the capacity acquisition control 108 initiates a supply chain adjustment workflow which, when processed, causes an increase to the rate at which new capacity is added to the computing nodes 110. In an embodiment, the capacity acquisition control 108 also triggers a workflow to adjust the rate and/or scheduling of installation procedures on the computing nodes. In a further aspect of these embodiments, these workflows may involve signaling the control plane 120 to suspend processing on certain of the computing nodes, or otherwise adjust operations, in order to facilitate the installation of additional capacity into the computing nodes 110. The workflows may be processed at least in part by the workflow processor 112.

In an embodiment, the capacity control module 104 provides information pertaining to the adjusted throttling parameters to the throttle control 102. In response to receiving the information, the throttle control 102 changes the conditions in which it will cause requests for capacity to be throttled. For example, in an embodiment, the adjusted throttling parameters indicate that low-priority capacity requests should be throttled when reserved capacity is at 20% of maximum, rather than at 15% as might have originally been the case. It will be appreciated that this example is intended to be illustrative, and should not be construed so as to limit the scope of the present disclosure to only those embodiments which adhere to the provided example.

In an embodiment, the capacity control module 104 provides a notification to the control plane 120 or the computing nodes 110, to cause capacity reserved for non-prioritized request types to instead be reserved for prioritized request types. In view of the adjusted capacity reservation parameter, the capacity control module 104 identifies one or more non-prioritized request types and causes capacity reserved for those types to instead be reserved for a prioritized types, thereby extending the predicted time at which prioritized requests will be made subject to throttling.

Figure 8:
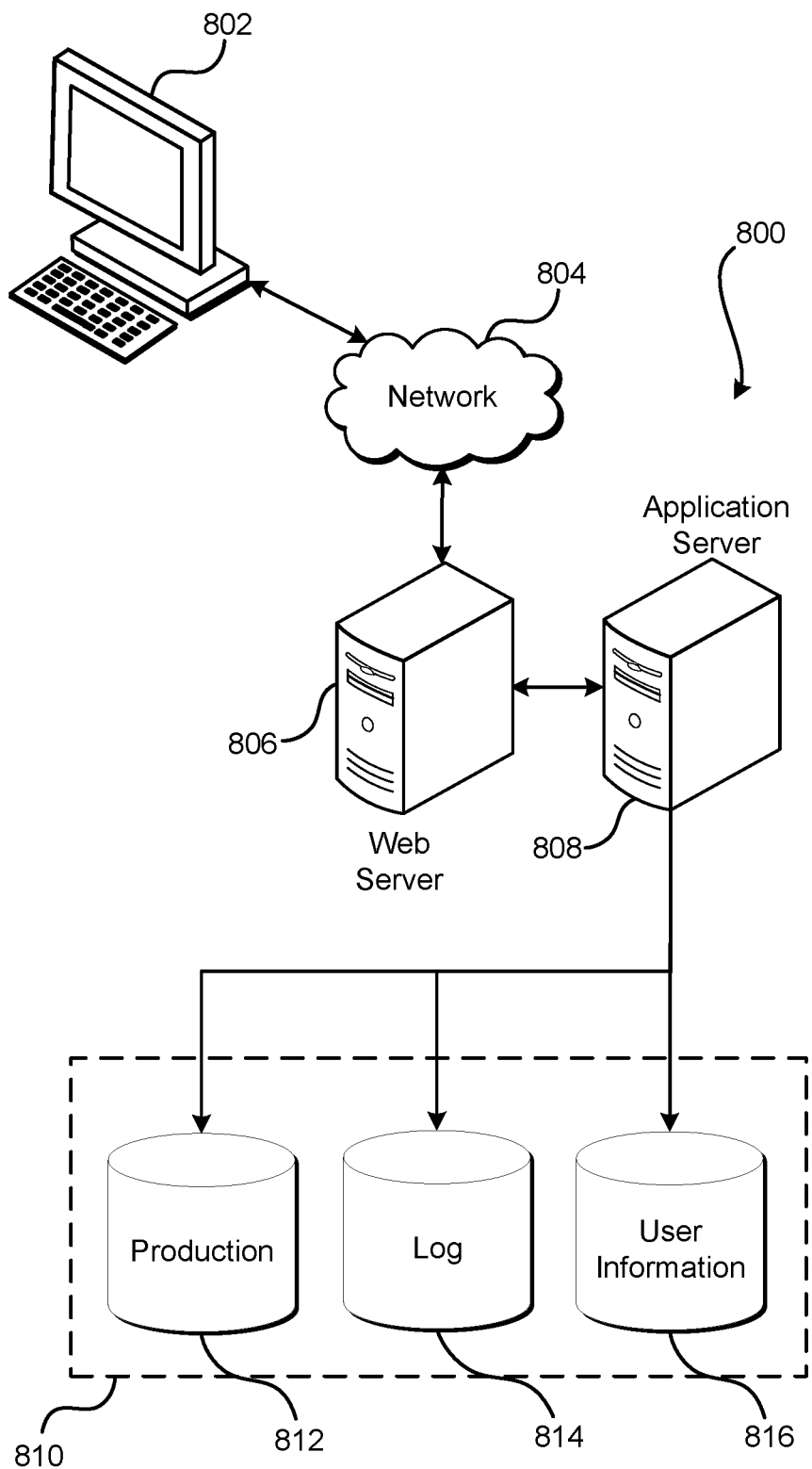
FIG. 8 illustrates a system in which various embodiments can be implemented.

In an embodiment, the computing nodes 110 correspond to the application servers 808 depicted in FIG. 8, or to a similar computing device. In an embodiment, the monitoring module 106, capacity control module 104, throttle control 102, and workflow processor module 112 are modules of a computing device, such as an application server 808. A module comprises stored computer executable instructions and a portion of a memory of a computing device, in which at least some of the processor-executable instructions are loaded. The instructions, in response to being executed cause the computing device perform the disclosed functions of the module.

In an embodiment, the monitoring module 106 and capacity control module 104 operate on an ongoing basis. The capacity control module 104 may periodically obtain updated information from the monitoring module 106 and generate a new forecast of capacity utilization. The capacity control module 104 may identify an update forecast for when available capacity will fall below a threshold level. If this time is earlier than a target time, the capacity control module 104 may generate an adjusted forecast by manipulating parameters of the forecast, and notifying the throttle control 102 and capacity acquisition control 108 of the adjusted parameters. In response, the throttle control 102 and capacity acquisition control 108 may act to cause the adjustments indicated by the parameters to be put into effect.

FIG. 2 illustrates an example forecast of a capacity control module. The forecast is illustrated in the context of a graph 200. The graph 200 is over two axes, a capacity axis 202 and a time axis 204. In an embodiment, a capacity control module, such as the capacity control module 104 of FIG. 1, generates a forecast 230 of projected reserved capacity 220 over time. In the example of FIG. 2, the forecast 230 is made from a time $t_0$ 210 to a time $t_{crit}$ 216. The time $t_0$ 210 represents the current time, and $t_{crit}$ represents a predicted time at which reserved capacity will reach zero. It will be appreciated that this example is intended to be illustrative, and should not be construed so as to require the forecast to span any specific timeline. For example, in an embodiment a forecast extends to a time ($t_{Hp}$) when capacity is predicted to fall to a point where high-priority requests would be subject to throttling.

In an embodiment, the forecast 230 predicts a time $t_{LP}$ at which reserved capacity is projected to reach a first threshold level $TH_{LP}$ 206. The threshold time $t_{LP}$ is used, in the embodiment, to identify a future time at which low-priority allocation requests will be throttled. In an embodiment, a capacity control module determines when other, more critical events may occur by planning on throttling low-priority requests at the time $t_{LP}$ 212. For example, in an embodiment the capacity control module identifies the time $t_{HP}$ and $t_{crit}$ based in part on an assumption that throttling of low-priority requests will begin at time $t_{LP}$.

In an embodiment, the forecast 230 predicts a time $t_{HP}$ at which reserved capacity is projected to reach a second threshold level $TH_{HP}$. This threshold time $t_{HP}$ is used, in the embodiment, by the capacity control module to identify a future time at which high-priority allocation requests will be throttled. In an embodiment, the capacity control module uses this time to predict $t_{crit}$ based on an assumption that throttling of high-priority requests will begin at time $t_{HP}$. In another embodiment, $t_{crit}$ is not calculated and the forecast stops at time $t_{HP}$. In another embodiment, a slope of the prediction is determined, without explicitly predicting capacity over a given period of time.

In an embodiment, a capacity control module may manipulate parameters of a prediction such that a time such as $t_{HP}$ is aligned with a target time. In an embodiment, a capacity control module initially generates a forecast using parameters which represent current or actual conditions, and then adjusts the parameters so that a forecast based on the parameters has a $t_{HP}$ time that aligns with a target time. Then, the adjusted parameters may be put into effect so that the adjusted prediction is more likely to align with actual trends.

Figure 3:
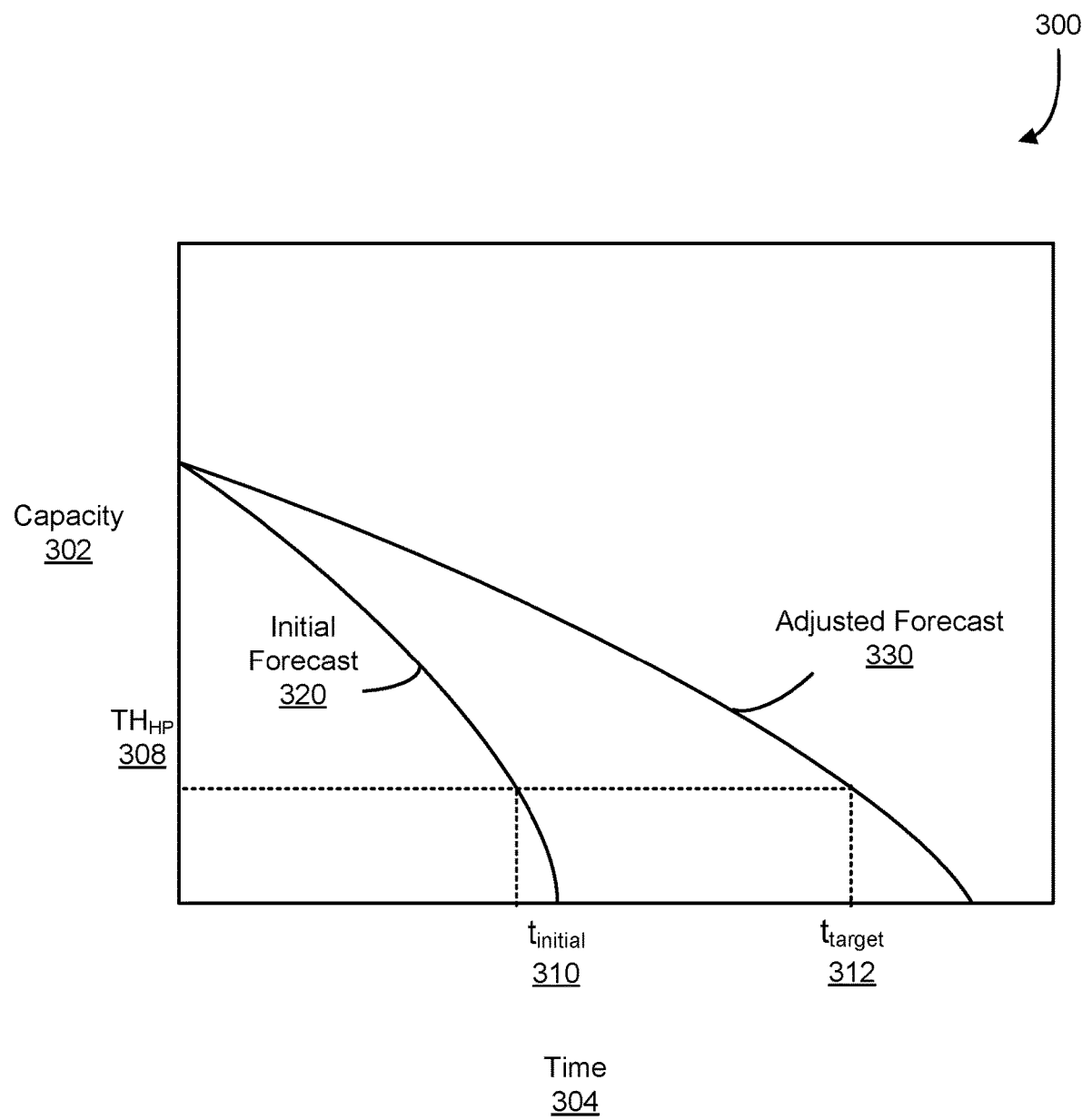
FIG. 3 illustrates an example adjusted forecast of a capacity control module.

FIG. 3 illustrates an example adjusted forecast of a capacity control module. FIG. 3 depicted an initial forecast 320 and an adjusted forecast 330 on a graph comprising a capacity axis 302 and a time axis 304. In the depicted example 300, a capacity control module, such as the capacity control module 104 depicted in FIG. 1, generates an initial forecast 320. The capacity control module generates the initial forecast 320 based on current conditions, as reflected in an initial parameter set. Projected reserve capacity for the initial forecast 320 crosses a threshold $TH_{HP}$ 308 at time $t_{initial}$ 310. Similar to the threshold $TH_{HP}$ 208 of FIG. 2, the threshold $TH_{HP}$ 308 refers to an amount of projected reserved capacity below which the system will begin throttling high-priority requests for capacity.

In an embodiment, the capacity control module determines that the time $t_{initial}$ 310 is sooner than a target time $t_{target}$ 312. In response to the determination, the capacity control module generates an adjusted forecast 330 by manipulating the initial parameter set. The capacity control module generates the adjusted forecast 330 so that projected reserved capacity crosses the threshold $TH_{HP}$ 308 at the target time $t_{target}$ 312. The capacity control module may then initiate operations which will cause actual conditions to align with the adjusted parameters.

Figure 4:
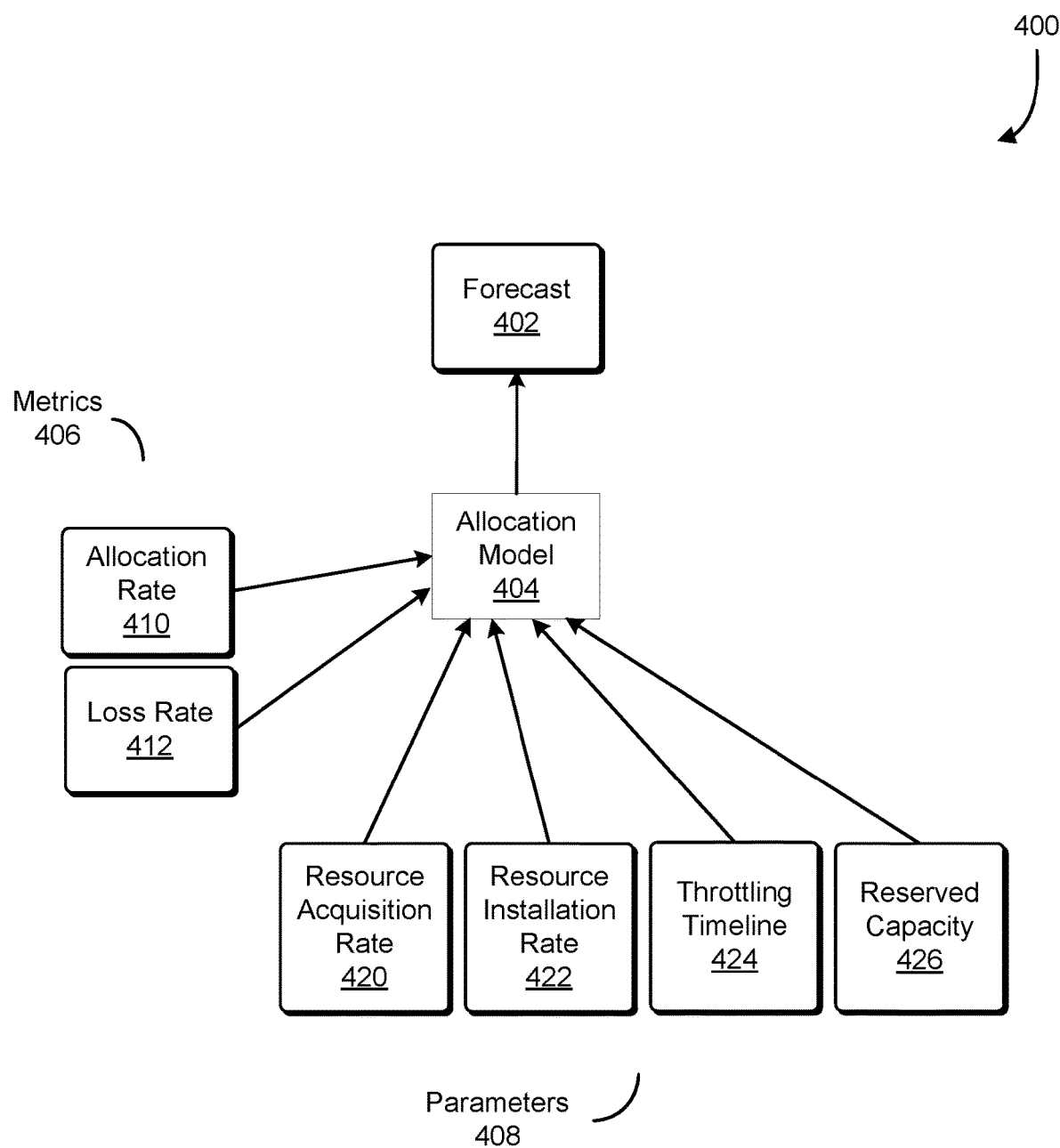
FIG. 4 illustrates aspects of an example embodiment of a capacity control module.

FIG. 4 illustrates aspects of an example embodiment of a capacity control module. In the depicted example, a capacity control module 400 comprises input buffers for metrics 406 and parameters 408. The metrics 406 correspond to data and statistics which are treated as fixed by the capacity control module 400. The parameters 408 correspond to data and statistics which are treated as variable by the capacity control module 400.

In an embodiment, a capacity control module uses metrics 406 as input to an allocation model 404. The metrics 406 comprise an allocation rate 410 and a loss rate 412. The allocation rate 410 indicates how fast the system is allocating capacity. For example, in an embodiment, the allocation rate 410 indicates how many kilobytes of data, per second, the system is allocating in response to client requests for storage space. In an embodiment, the metrics 406 also comprise a loss rate 412 which indicates how quickly available resources are being made unavailable based on reasons such as hardware failure.

In an embodiment, the capacity control module uses parameters 408 as input to the allocation model 404, and also adjusts one or more of the parameters 408 to generate an adjusted forecast in which projected reserved capacity crosses a threshold at a target time. In an embodiment, the parameters 408 comprise an amount of reserved capacity 426. The reserved capacity 426 refers to a current amount of unallocated capacity, i.e., capacity available for allocation as of the time the prediction is made.

In an embodiment, the parameters 408 comprise a throttling timeline 424. The throttling timeline 424 describes a plan for throttling allocation requests. The information includes one or more pairings of a request type and a future time at which throttling of requests of that type should begin.

In an embodiment, the parameters 408 comprise a resource installation rate 422. The resource installation rate describes the rate at which new capacity may be installed on the system. For example, in an embodiment new capacity may be purchased and available for installation, but due to various constraints may be added only as quickly as indicated by the resource installation rate 422. The resource installation rate 422 may, for example, be constrained by factors such as distribution of load across computing nodes, when the nodes of the system may be brought offline in order for resources to be installed, and so on.

In an embodiment, the parameters 408 comprise a resource acquisition rate 420. The resource acquisition rate 420 describes the rate at which new capacity may be acquired for installation. The allocation model 404 may reflect relationships between the resource acquisition rate 420 and the resource installation rate 422. For example, the model may reflect a constraint imposed on the resource installation rate 422 by the resource acquisition rate 420.

The capacity prediction model may compute outputs of the allocation model 404 in order to produce a forecast 402. In an embodiment, the outputs are computed in an iterative, goal-seeking process in which the values of various parameters 408 are adjusted in various permutations until the predicted time of crossing the relevant capacity threshold is approximately equal to the target time.

Figure 5:
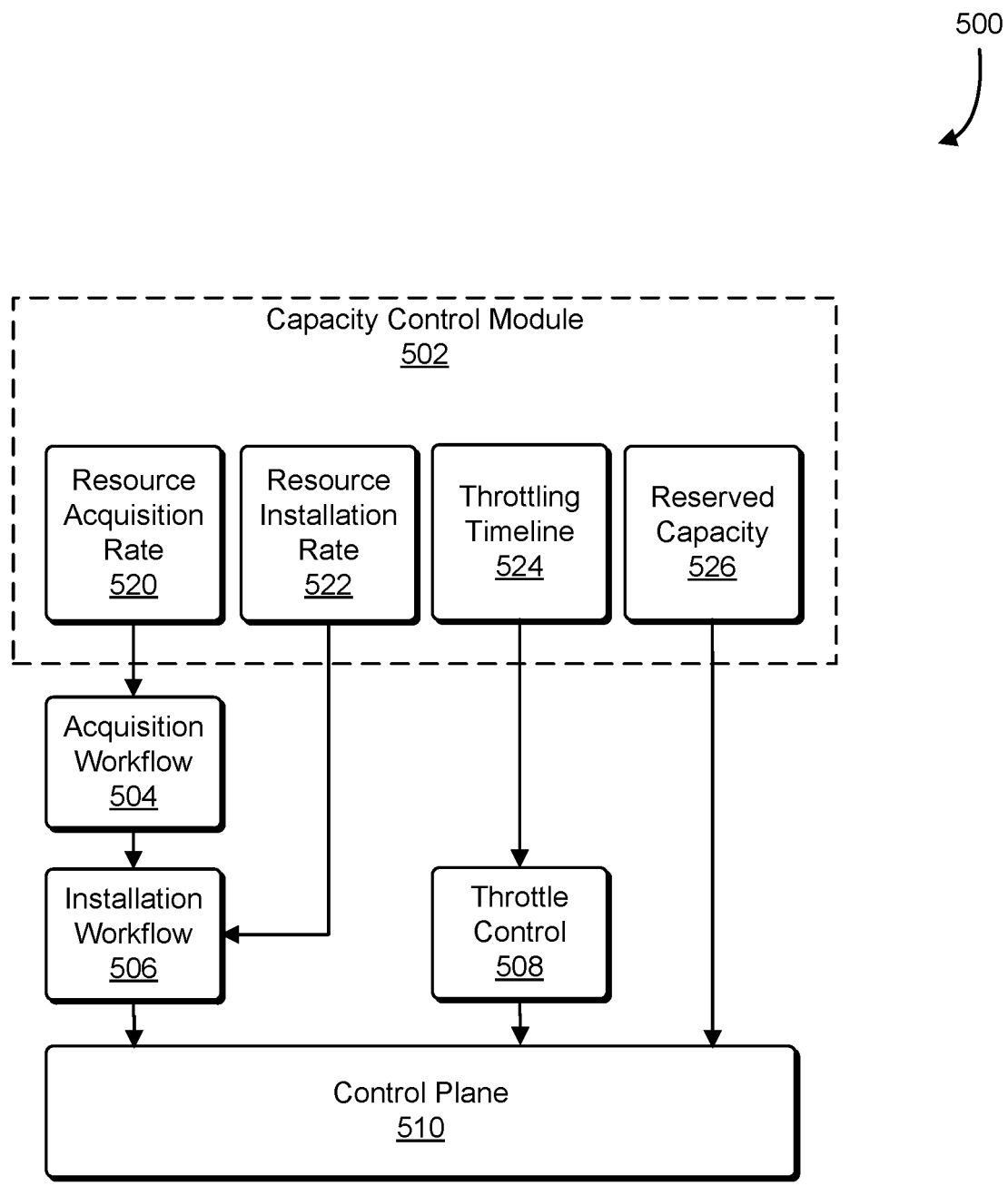
FIG. 5 illustrates an example embodiment of a system controlling reserved capacity based on output parameters of a capacity control module.

FIG. 5 illustrates an example embodiment of a system controlling reserved capacity based on output parameters of a capacity control module. A distributed system 500 comprises a capacity control module 502 which identifies values for parameters 520-526 based on projections of reserved capacity. In an embodiment, the capacity control module 502 corresponds to the capacity control module 104 depicted in FIG. 1.

In an embodiment, the capacity control module 502 causes an acquisition workflow 504 to execute, resulting in the acquisition of resources in accordance with the adjusted resource acquisition rate parameter 520. For example, in an embodiment, execution of the acquisition workflow 504 causes a sequence of actions to be taken to acquire new resources at a greater rate than was previously the case, so that resources are acquired at a rate which, to the extent possible, matches the rate indicated by the adjusted parameter 520. Note that there may be situations in which the actions taken to acquire new resources may be delayed or not as effective as initially planned. The adjusted forecast may therefore be inaccurate. However, embodiments of the processes described herein may be performed periodically in order to detect and react to such situations.

In an embodiment, the capacity control module 502 causes installation workflow 506 to execute, resulting in the installation of resources in accordance with the adjusted resource installation rate parameter 522. Execution of the installation workflow 506 causes installation activities to be performed, thereby adding to the total capacity of the distributed system. These activities may include those requiring the intervention of the control plane 510. For example, in an embodiment, the installation process causes the control plane 510 to do one or more of system configuration, load rebalancing, shutdown, and restart.

In an embodiment, the capacity control module 502 notifies the throttle control 508 of an adjusted throttling timeline 524. Based on the adjusted throttling timeline, the throttle control 508 puts into effect a plan for throttling requests to allocate capacity if the indicated conditions are met. For example, as explained regarding FIGS. 2 and 3, low-priority requests can be throttled if available capacity drops below a first threshold level $TH_{LP}$, and high-priority requests can be throttled if available capacity drops below a second threshold level $TH_{HP}$. It will be appreciated that this example is intended to be illustrative, and should not be construed in a manner which limits the scope of the present disclosure to only the specific examples provided. In other embodiments, no throttling is used, and in still other embodiments throttling is used only when available capacity reaches a critical level.

In an embodiment, the capacity control module 502 causes the amount of capacity available for allocation to be adjusted based on an adjusted reserved capacity parameter 526. Note that while the distributed system 500 may take a variety of actions which indirectly affect available capacity, such as installing new capacity or throttling requests, the distributed system 500 may also, in some cases, directly increase or decrease the amount of available capacity. For example, in an embodiment, the capacity control module 502 directs the control plane 510 to add additional capacity based on the adjusted reserved capacity parameter 526. In response, the control plane 510 makes capacity intended for other purposes available for allocation.

Figure 6:
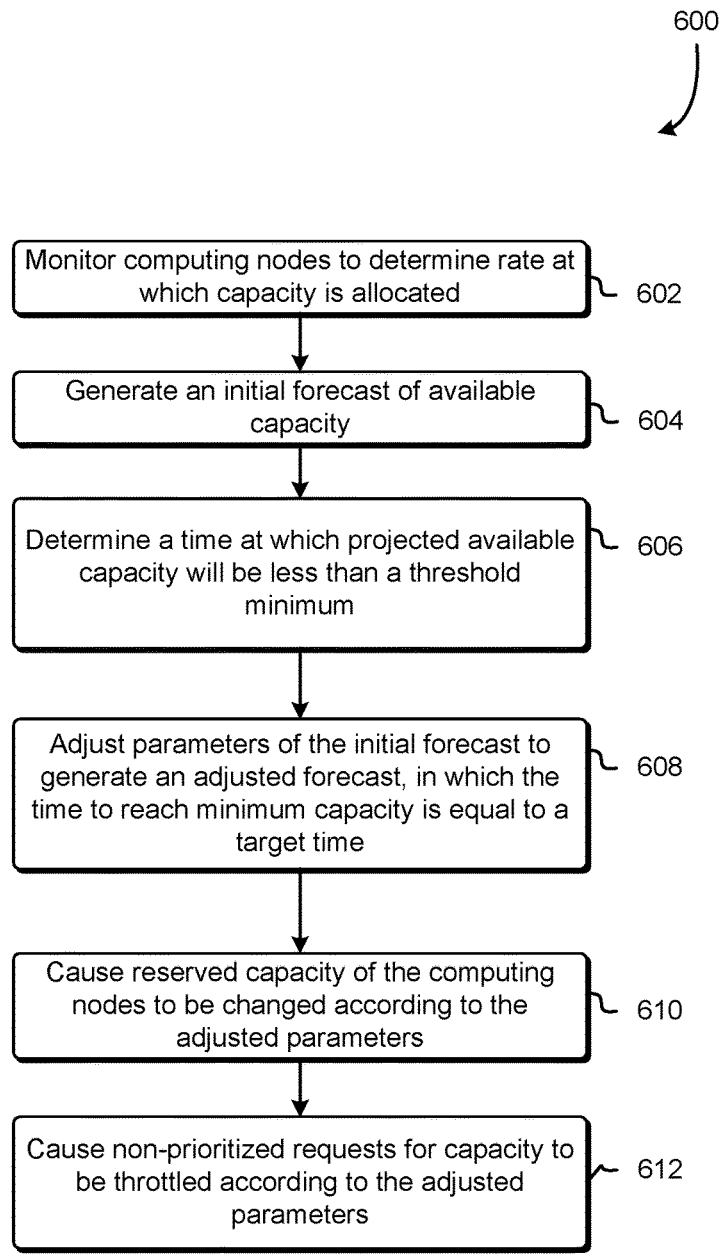
FIG. 6 illustrates an example process in which a distributed system manages amounts of reserved capacity.

FIG. 6 illustrates an example process in which a distributed system manages amounts of reserved capacity. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an example embodiment, the process 600 depicted in FIG. 6 is performed by a distributed system, such as the distributed system 100 illustrated by FIG. 1. In the example embodiment, capacity buffers are maintained on the computing nodes 110, such that the predicted time at which capacity will fall below a threshold level is kept at a fixed distance in the future. In an embodiment, aspects of the depicted process 600 are performed by the capacity control module 104.

At step 602, the distributed system 100 monitors computing nodes to determine a rate at which capacity is being allocated. In an embodiment, the monitoring comprises receiving allocation data from each of the computing nodes 110 of the distributed system 100. In an embodiment, a monitoring module 106 collects the data from the computing nodes 110 and provides the data to the capacity control module 104. The capacity control module 104 then uses this data to calculate a rate at which the aggregate capacity of the computing nodes 100 is being allocated.

At step 604, the distributed system 100 generates an initial forecast of available capacity. In an embodiment, the initial forecast is calculated by the capacity control module 104 based on observed metrics such as the rate at which capacity is being allocated, and on a set of parameters. In an embodiment, the parameters are reflective of conditions when the initial forecast is generated. For example, in an embodiment the parameters include the amount of capacity currently available for allocation, conditions under which low-priority requests will be throttled, and rate at which new capacity is being added to the system.

At step 606, the distributed system 100 determines a time at which the projected available capacity will be less than a threshold amount. In an embodiment, the capacity control module 104 determines the threshold amount based on the capacity needed to prevent throttling of high-priority requests. In a further aspect of an example embodiment, low-priority requests are throttled prior to capacity reaching the threshold. If other parameters remain constant, throttling low-priority requests allows for a longer runway, thus delaying the onset of throttling high-priority requests.

At step 608, the distributed system 100 adjusts the parameters of the initial forecast to generate an adjusted forecast. In an embodiment, the capacity control module 104 generates the adjusted forecast so that the time that available capacity is projected to be less than the threshold minimum is equal to a target time. In another aspect, the system generates the adjusted forecast so that the slope of the forecast is equal to a target slope.

In an embodiment, the parameters are adjusted by selecting one or more types of requests to be made subject to throttling prior to the time the capacity is projected to be less than the threshold amount. In an example embodiment, the distributed system 100 provides storage volumes, which may include boot volumes, data volumes, or redundancy volumes. By way of example, requests for boot volumes might be considered high priority, while requests for data and redundancy volumes might be considered low priority. In generating an adjusted forecast, the distributed system 100 might be able to align the target time or slope of the forecast by manipulating various parameters of the forecast. The parameters might include determining which types of requests to make subject to throttling, and/or determining when to subject a type of request to throttling. For example, boot volume requests might be considered high-priority, and not made subject to throttling until available capacity has reached the end of the runway. Requests for redundancy volumes, on the other hand, might be considered to be relatively low priority, and scheduled for throttling in order to stretch the predicted runway.

In an embodiment, the adjusted forecast is based on a planned overutilization of capacity. For example, the forecast may be based on an assumption that capacity reserved for low-priority requests may be permitted to be overutilized, in order to extend the time at which high-priority requests are predicted to be made subject to throttling. In an embodiment, the adjusted forecast is based on an assumption that capacity reserved for low-priority requests may be allowed to degrade over time. In an example, separate runways may be calculated for low-priority and high-priority requests. In order to maintain these two runways, separate amounts of capacity are kept in reserve for each, so that the target time of each runway is preserved. However, the runway predicting capacity for high-priority requests may be made under the assumption that the amount of reserved, or buffer, capacity for low-priority requests may be allowed to degrade, if necessary, in order to maintain the runway for high-priority requests.

In an embodiment, request types associated with high utilization levels are classified as low priority, and made subject to throttling in order to extend the time at which prioritized requests are likely to be made subject to throttling. These requests types may, for example, include larger requests, requests that are issued frequently by a single entity, and so on.

In an embodiment, a first set of request types is prioritized, and a second set of request types is de-prioritized. Different types of request types are thus partitioned between priority levels. The types of requests may include, but are not limited to, requests to allocate boot volumes, requests to allocate data volumes, requests to allocate redundancy volumes, and requests associated with high utilization.

In an embodiment, the slope or target time of the adjusted forecast is based on factors that reflect the reactivity of the system to parameter adjustments. For example, an adjusted parameter might correspond to the rate at which new capacity can be added to the system. In some situations and embodiments, the actual rate at which new capacity can be made to track the corresponding parameter relatively quickly. However, in other situations and embodiments, it may take more time to cause the actual rate to be adjusted. The former case is indicative of a shorter runway, while the latter is indicative of a longer runway.

At step 610, the distributed system 100 causes reserved capacity of the computing nodes to be changed according to the adjusted parameters. In an embodiment, this step is performed by the control plane 120 and comprises reserving unallocated capacity, adding additional capacity, or freeing capacity previously used for other purposes. Embodiments may also react to indicated decreases in reserved capacity by, for example, dedicating reserved capacity to another purpose.

In an embodiment, capacity reserved for responding to prioritized requests for capacity is adjusted by reallocating capacity that had been reserved for non-prioritized requests. The adjustment is performed in accordance with modifications made to the adjusted parameters, in order to align the predicted runway with the target runway. By reallocating the capacity, non-prioritized requests may be throttled earlier than would otherwise be the case. The reallocation may therefore non-prioritized capacity to be throttled earlier than non-prioritized requests. By incorporating this effect into the prediction, the distributed system 100 is able to extend the forecasted time at which prioritized requests will become subject to throttling.

At step 612, the distributed system 100 throttles requests for capacity according to the adjusted parameters. This step may comprise the capacity control module informing the throttle control 102 of the adjusted parameters. In an embodiment, the adjusted parameters include changes to the conditions under which requests for capacity will be throttled. For example, a new class of request might be made subject to throttling, or the time at which a given class of request is to be made subject to throttling is moved earlier or later in time. In the example of FIG. 1, the throttle control 102 is notified of the changes, so that throttling can occur according to the adjusted throttling plan.

In an embodiment, the process 600 is repeated periodically, aperiodically, or otherwise repeatedly, so that the time at which capacity is predicted to fall below a threshold is maintained at a fixed distance in time from the present time. In an embodiment, periodic forecasts and corresponding parameter adjustments are made to keep the time capacity is projected to fall below a threshold amount at a fixed distance away in time. Similarly, in another embodiment, periodic adjustments are made so that the slope of the runway remains consistent with an intended slope.

Figure 7:
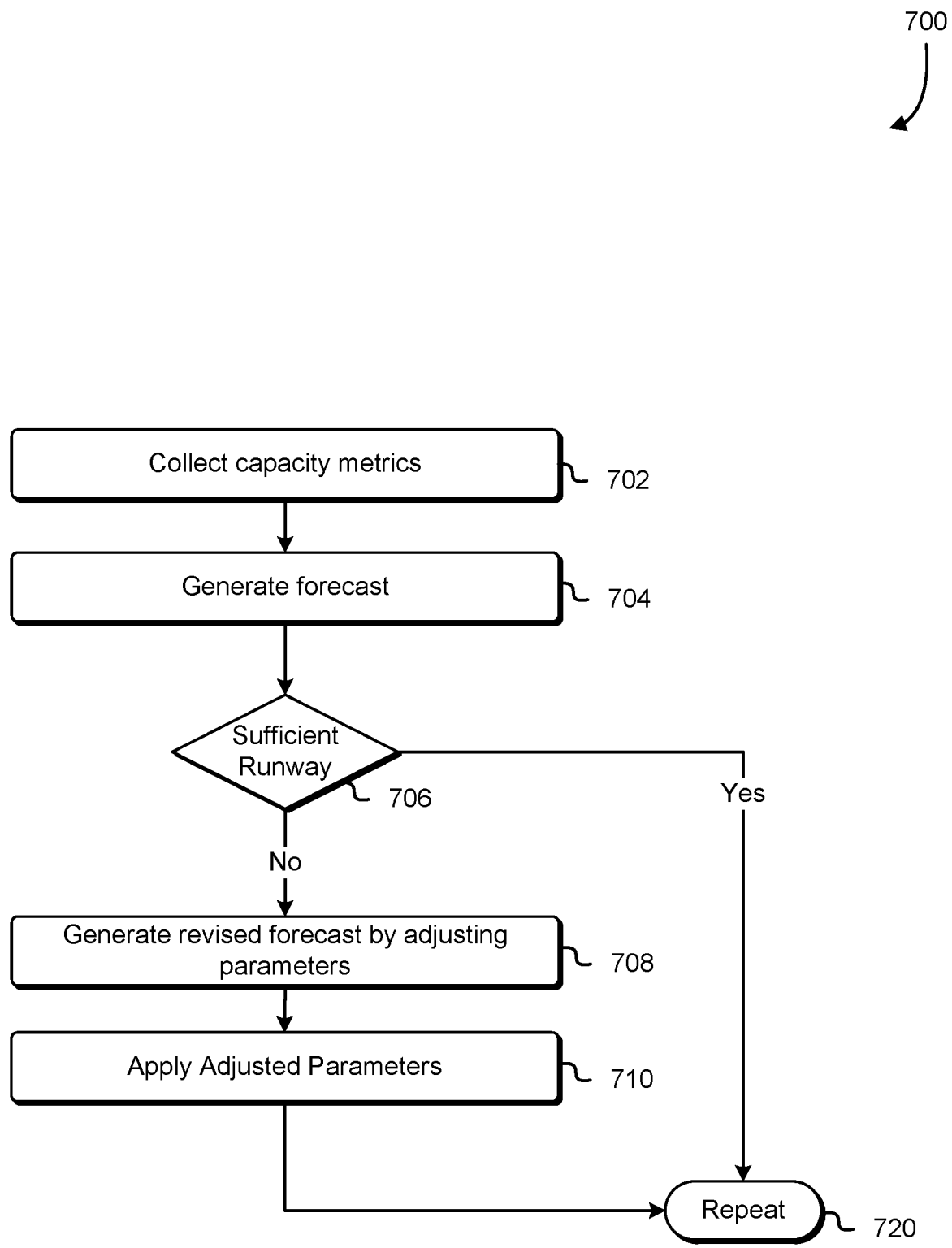
FIG. 7 illustrates additional aspects of an example process in which a distributed system manages amounts of reserved capacity.

FIG. 7 illustrates additional aspects of an example process in which a distributed system manages amounts of reserved capacity. Although FIG. 7 is depicted as a flow diagram comprising sequences of steps, the depicted sequences should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

In an example embodiment, the process 700 depicted in FIG. 7 is performed by a distributed system, such as the distributed system 100. In an embodiment, aspects of the depicted process 700 are performed by the capacity control module 104.

At step 702, the distributed system collects capacity metrics, including but not necessarily limited to metrics indicating the rate at which capacity of the system 100 is being allocated to clients. This step may also comprise obtaining data relevant to setting initial values of parameters used to forecast capacity allocation.

At step 704, the distributed system generates a forecast of available capacity, based on the collected metrics and initial parameter values. Then, at step 706, the distributed system determines whether, based on the prediction, there is sufficient runway. If the current prediction indicates a sufficient runway, the process 700 repeats as indicated by block 720.

At step 708, if there was not sufficient runway, the distributed system generates a revised forecast by adjusting parameters. A variety of techniques may be employed to generate a revised forecast which is based on the adjusted parameters and which possesses the desired characteristics. In an embodiment, a state-space search is performed. A series of successive parameter configurations are formed and a prediction generated. The configurations and corresponding predictions may be scored, and branches of the search pruned, until at least one suitable configuration is found. Other heuristics may be employed. In cases where there are few parameters—for example if the only parameter is available capacity—values for the adjusted parameters may be directly calculated.

At step 710, the adjusted parameters are applied to the system. This may, for example, comprise initiating workflows and other steps, such as those depicted in FIG. 5. These steps are taken to cause underlying conditions to correspond to the assumptions made in the revised forecast.

As depicted by block 720, the process 700 repeats on a periodic basis. Periodically repeating the process may help to maintain a desired runway slope or target time, in part by being reactive to changing capacity allocation rates, and in part by being reactive to attempts to align underlying conditions with adjusted parameter values. For example, a parameter might be adjusted to increase the rate at which new capacity is added to the system. Responsive to this increase, the system 100 might trigger workflows to add the new capacity. However, if some of these workflows fail, new capacity might be added at a slower rate than anticipated. Repetition of the depicted process 700 helps the system 100 to be reactive to such events.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed computing system comprising a plurality of application servers 808. The application servers 808 may also be referred to as compute nodes, or computing nodes. In some embodiments, the application servers 808 comprise virtualization services and/or virtual machines. In an embodiment, with reference to FIG. 1, the computing nodes 110 correspond to the application servers 808. In an embodiment, the control plane 120 of FIG. 1 is also hosted on one of the application servers 808. In a further aspect, the web server 806 provides an application programming interface through which a client device 802 transmits requests for capacity.

The system 800, in an embodiment, is a distributed computing system and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. Additionally, unless otherwise noted or contradicted by context, the phrase "based on" is not intended to mean "based solely on," but rather "based at least in part on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory that stores processor-executable instructions that, in response to being executed by the at least one processor, cause the system to at least:
   monitor a plurality of computing nodes to determine a rate of allocation of capacity of the plurality of nodes to provide a computing resource;
   generate a forecast of capacity available for allocation, wherein the forecast predicts a time at which the capacity available for allocation will be less than a threshold amount, wherein the forecast is based at least in part on the rate of allocation, on a first parameter corresponding to an amount of reserved capacity, and on a second parameter corresponding to conditions for subjecting at least some requests to allocate capacity to throttling;
   generate, in response to the forecast misaligning with a target time and based at least in part on a selection of one or more types of requests to be made subject to throttling prior to the target time, a second forecast that predicts capacity available for allocation being less than the threshold amount at the target time, wherein the first and second parameters are adjusted to cause the second forecast to align with the target time;
   cause reserved capacity of the plurality of computing nodes to be increased or decreased based on the adjusted first parameter; and
   cause one or more types of requests to allocate capacity to be throttled in accordance with the adjusted second parameter.

2. The system of claim 1, wherein the second parameter comprises a type of request to be made subject to throttling.

3. The system of claim 1, wherein the second forecast comprises an estimated slope based at least in part on the adjusted first and second parameters.

4. The system of claim 1, wherein the processor-executable instructions, in response to being executed by the at least one processor, further cause the system to at least generate the second forecast based at least in part on a third parameter corresponding to a rate of adding additional capacity to the plurality of computing nodes.

5. The system of claim 1, wherein reserved capacity is repeatedly readjusted to keep the predicted time at which the available capacity will be less than the threshold amount at a target distance away in time.

6. A computer-implemented method, comprising:
   monitoring a rate of allocation of capacity of a plurality of computing nodes;
   generating a forecast of capacity available for allocation in response to prioritized requests and a selection of one or more types of requests to be made subject to throttling prior to a target time, wherein the forecast indicates a time at which the capacity available for allocation will be less than a threshold amount, wherein the forecast is based at least in part on the rate of allocation, a first parameter corresponding to an amount of capacity currently available for allocation, and a second parameter indicative of conditions for throttling requests to allocate capacity, wherein values for the first and second parameters are selected based at least in part on aligning the time with the target time;
   causing reserved capacity of the plurality of computing nodes to be modified in accordance with the first parameter, the reserved capacity modified by at least reallocating capacity reserved for non-prioritized requests; and
   throttling one or more types of requests to allocate capacity in accordance with the second parameter.

7. The computer-implemented method of claim 6, wherein the threshold amount is determined based at least in part on an amount of available capacity required to prevent throttling of prioritized requests for capacity.

8. The computer-implemented method of claim 6, further comprising associating first request types with the prioritized requests and second request types with the non-prioritized requests, wherein the request types comprise one or more of requests to allocate boot volumes, requests to allocate data volumes, requests to allocate redundancy volumes, and requests associated with high utilization.

9. The computer-implemented method of claim 6, further comprising generating the forecast based at least in part on an adjusted rate of adding additional capacity to the plurality of computing nodes.

10. The computer-implemented method of claim 6, wherein reserved capacity is readjusted to keep the predicted time at which the available capacity will be less than the threshold amount at a target distance away in time.

11. The computer-implemented method of claim 6, further comprising:
- determining an amount of capacity needed to prevent throttling of prioritized requests to allocate capacity; and
- generating the forecast based at least in part on using the determined amount of capacity as the threshold amount.

12. The computer-implemented method of claim 6, further comprising adding additional capacity based at least in part on maintaining a target slope of a forecast allocation trend.

13. A non-transitory computer-readable storage medium having stored thereon executable instructions that, as a result of being executed by one or more processors of a computer system, cause the computer system to at least:
- receive information indicative of a rate of allocation of capacity of a plurality of computing nodes;
- generate a forecast of capacity available for allocation based at least in part on a selection of one or more types of requests to be made subject to throttling prior to a target time, wherein the forecast indicates a time at which the capacity available for allocation in response to prioritized requests for capacity will be less than a threshold amount, wherein the forecast is based at least in part on the rate of allocation, a first parameter indicative of capacity currently available for allocation, and a second parameter indicative of throttling requests to allocate capacity, wherein a value for the first parameter is selected based at least in part on aligning the predicted time with the target time;
- cause capacity of the plurality of computing nodes available for prioritized requests to be modified in response to a change to the first parameter, by at least reallocating capacity reserved for non-prioritized requests; and
- cause one or more types of requests to allocate capacity to be throttled in accordance with the second parameter.

14. The non-transitory computer-readable storage medium of claim 13, wherein reallocating capacity reserved for non-prioritized requests for capacity is planned to cause throttling of non-prioritized requests prior to the target time.

15. The non-transitory computer-readable storage medium of claim 13, wherein the instructions further comprise instructions that, as a result of being executed by the one or more processors, cause the computer system to align the target time to a fixed distance in time based at least in part on repeatedly generating additional forecasts.

16. The non-transitory computer-readable storage medium of claim 13, wherein the instructions further comprise instructions that, as a result of being executed by the one or more processors, cause the computer system to determine conditions for throttling requests prior to the target time.

17. The non-transitory computer-readable storage medium of claim 16, wherein throttling of low-priority requests is predicted to begin prior to the target time and throttling of high-priority requests is predicted to begin at the target time.

18. The non-transitory computer-readable storage medium of claim 13, wherein the forecast of capacity is based at least in part on planned overutilization of capacity.

19. The non-transitory computer-readable storage medium of claim 13, wherein the instructions further comprise instructions that, as a result of being executed by the one or more processors, cause the computer system to respond to the forecast by changing one or more operational parameters in accordance with the first parameter of the forecast.

20. The system of claim 1, wherein the processor-executable instructions further cause the system to respond to the second forecast by changing a condition in response to which the system causes the one or more requests to allocate capacity to be throttled.

* * * * *